Figure 1:
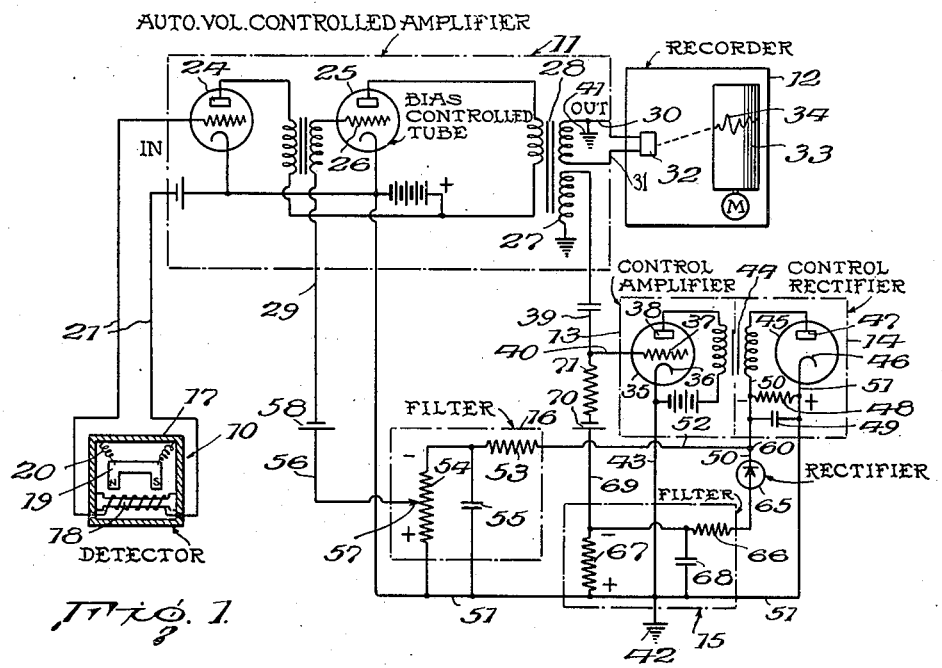

June 9, 1942.  O. F. RITZMANN  2,286,106
APPARATUS FOR AND METHOD OF RECEIVING AND RECORDING VIBRATIONS
Filed Feb. 9, 1939    2 Sheets-Sheet 1

Inventor
O. F. Ritzmann,
By A. M. Houghton
his Attorney

June 9, 1942.   O. F. RITZMANN   2,286,106
APPARATUS FOR AND METHOD OF RECEIVING AND RECORDING VIBRATIONS
Filed Feb. 9, 1939    2 Sheets-Sheet 2

Inventor
O. F. Ritzmann,
By A. M. Houghton
Attorney

Patented June 9, 1942

2,286,106

UNITED STATES PATENT OFFICE 2,286,106

APPARATUS FOR AND METHOD OF RECEIVING AND RECORDING VIBRATIONS

Otto F. Ritzmann, Pittsburgh, Pa., assignor to Gulf Research & Development Company, Pittsburgh, Pa., a corporation of Delaware Application February 9, 1939, Serial No. 255,494

7 Claims. (Cl. 177—352)

This invention or discovery relates to improvements in apparatus for and methods of receiving and recording vibrations; and it comprises more particularly apparatus for receiving and recording seismic waves or other mechanical waves including wave-detecting means, recording means and amplifying means constructed and arranged for control of some characteristic thereof, such as gain or frequency response, in accordance with the amplitude of the detected vibrations and characterized by the provision of means constructed and arranged to suppress the action of such controlling means, operative shortly after receipt of the first strong signal; and it further comprises an improved method of seismograph prospecting including the steps of electrically detecting vibrations by detectors, amplifying the detector signals, controlling the gain or other amplification characteristic in accordance with the amplitude of the detected vibrations, and suppressing said controlling action shortly after detection of the first large-amplitude vibrations; all as more fully hereinafter set forth and as claimed.

One object achieved in the invention is the provision of methods of and means for detecting, amplifying and recording mechanical vibrations of fluctuating amplitude in which the degree of amplification or the tuning is controlled in accordance with the amplitude of the detected vibrations, during receipt of the first strong vibrations, and the controlling action is then uniformly and gradually suppressed so as to secure a relatively undistorted record of the later vibrations.

Another achieved object is the provision of a method for electrically detecting, amplifying and recording vibrations of fluctuating amplitude, in which a portion of the electrical signal from the detector is diverted and is caused to control the amplification factor or some other characteristic of the amplifier, and this controlling action is suppressed shortly after detection of the first vibrations, so as to secure clear records of subsequent vibrations; and the provision of an apparatus organization for carrying out such method.

In seismograph prospecting, a charge of explosive is fired in the earth, thereby producing a small-scale artificial earthquake, and the earth tremors are observed at a point (or more usually a plurality of points) spaced from the source of earth vibrations. The shock wave from the exploding charge spreads through the earth in all directions as a wave or waves. Part of the wave energy passes along close to the surface of the earth, and reaches the observing position by a more or less direct path. This wave is ordinarily the first to reach the observing position. Part of the shock energy penetrates downward into the earth, and is reflected and refracted from underground strata interfaces, fault planes, etc., and reaches the observing position by indirect paths. The effect observed at the observing position is first a rather sudden, violent vibration, corresponding to the first arrival, followed by a series of vibrations of generally decreasing amplitude. Some of these latter vibrations are stronger than others, and correspond to arrival of waves which have been reflected or refracted upwardly from subterranean strata interfaces. The various vibrations come along over a time interval of a second or a few seconds.

By detecting, amplifying and recording these various earth vibrations, information can be secured as to the existence and location of subterranean geological structures. In modern seismograph prospecting practice, the earth waves are detected by electrical detectors which produce a fluctuating electrical signal corresponding to the amplitude of the earth tremors, or to the velocity or the acceleration of such tremors depending on the particular type of detector used. The electrical signal is amplified by a vacuum tube amplifier and the amplified signal is recorded as a wavy trace on photographic sensitized paper by an oscillograph. The width of this trace is determined by the amplification or gain factor of the amplifier, which can be preliminarily adjusted to any predetermined value at pleasure.

As stated, the first-arriving wave is in general much more violent than any of the later waves. The difficulty arises that if the amplification factor or gain of the amplifier is adjusted so that the first arrival is recorded at a moderate amplitude, then the later arrivals are recorded at inconveniently small amplitudes; while if the amplifier is adjusted to receive the later arrivals with readable amplitude, the record of the first arrival goes clear off the recording paper because of its strength. Accordingly, there have come into use automatic volume control amplifiers; that is amplifiers arranged so that gain or amplification factor thereof is automatically reduced when the incoming signal is strong, and restored to its normal value when the incoming signal is weak. Such amplifiers usually embody means for taking off a portion of the signal energy either from the input or the output of the amplifier, and causing this energy to bias a tube in the amplifier which tends to lessen the sensitivity of the amplifier when the signal strength rises unduly. These automatic volume controls are somewhat analogous to those employed in radio sets to prevent "blasting" or to compensate for "fading."

In general such automatic volume control amplifiers give better results than plain amplifiers, but they introduce certain disadvantages. As stated, while the over-all amplitude of the detected waves generally diminishes after the first arrival, the rate of amplitude decay, or attenuation, is not a smooth function. Strong reflections give rise to sharp momentary increases in amplitude followed by somewhat less abrupt decay. These fluctuations in the attenuation characteristics of the detected waves cause spasmodic operation of the volume controller, and as a result the relative amplitudes of recorded waves are altered in irregular ways. There is distortion, and the distortion is of an irregular and annoying kind.

There have also come into use analogous prospecting systems in which the frequency response of the amplifier (i. e. the tuning) is varied in accordance with signal amplitude changes, which systems are based on the fact that in a general way the best tuning frequency for an amplifier is more or less proportional to the amplitude of the received waves. Sometimes frequency control and volume control are both provided. In either case, the sharp fluctuations in signal amplitude make for spasmodic, irregular operation of the tuning control.

Somewhat similar problems arise in the arts of sonic depth finding and submarine signalling, wherein a sharp pulse of sound is sent out and is received and registered or recorded electrically. Here again it is desirable to have automatic volume control to prevent undue amplification of the first or strongest signals, but after receipt of such signals the automatic volume control tends to be a handicap rather than an advantage.

According to the present invention these deficiencies of conventional automatic amplifier control systems are obviated, and new advantages are secured, by the provision of an auxiliary control circuit, adapted to suppress gradually the controlling effect of the automatic amplifier control proper, shortly after receipt of the first wave at the detectors. The action is such that the main amplifier control acts during receipt of the first arriving waves, so as to modify the recorded amplitude (or adjust the tuning) for the first arrival, and is then gradually rendered ineffective by the auxiliary control circuit, so that the later arriving waves are relatively unaffected and distortion is minimized. Amplifiers can be controlled as regards gain; or as regards frequency response; that is to say, controlled as regards the frequency or as regards the band of frequencies passed and amplified by the amplifier.

In the accompanying drawings there are shown diagrammatically three examples of specific embodiments of apparatus within the purview of the invention and capable of utilization in performing the method. In the drawings—

Figure 2:
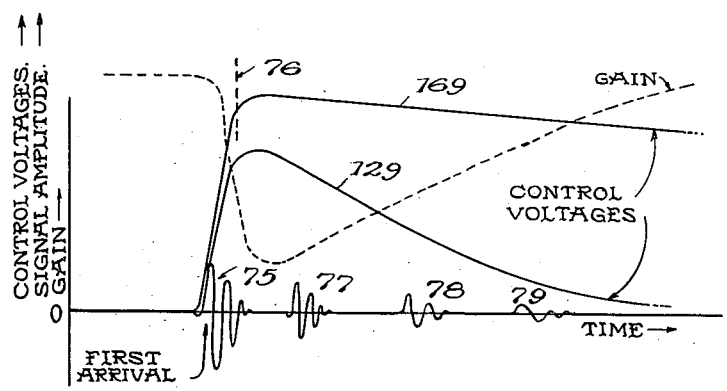
Figure 3:
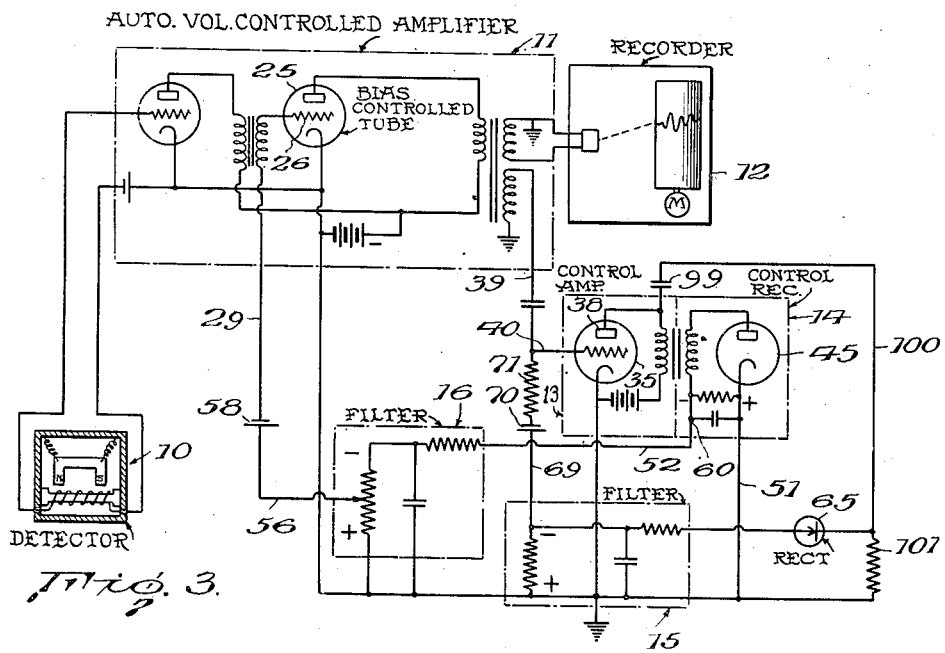
Figure 4:
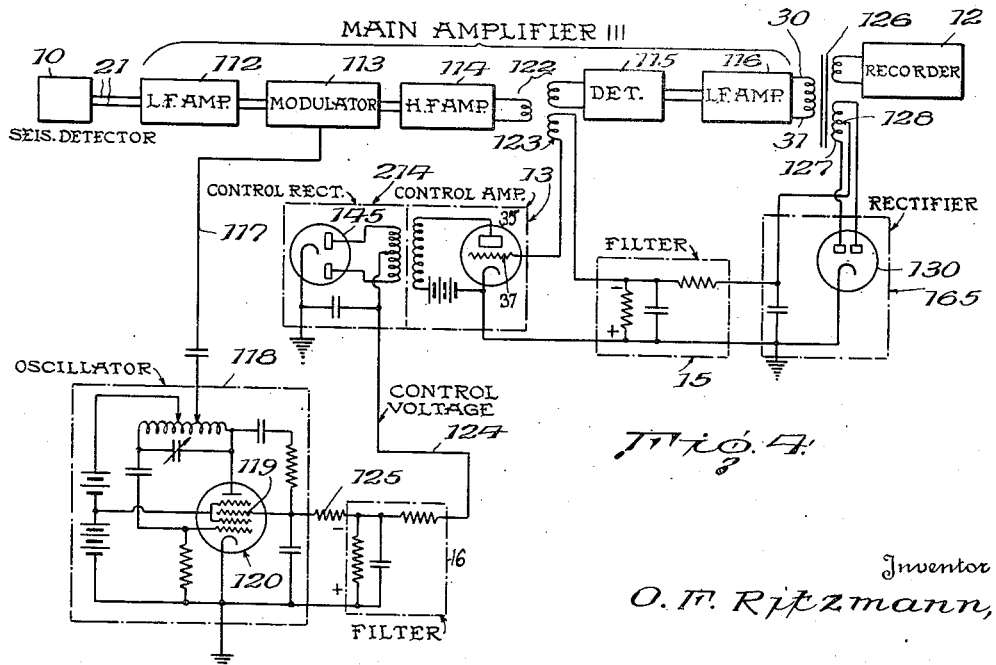

Fig. 1 is a circuit diagram of one form of the invention embodied in a gain-controlled amplifier, Fig. 2 is a graph illustrating the relation of control voltages to signal amplitude over the course of time in the apparatus of Fig. 1, Fig. 3 is a diagram of a modified form of the apparatus of Fig. 1, and Fig. 4 is a diagram of a form of the invention embodied in a frequency-controlled amplifier.

Referring to the drawings, Fig. 1 shows one form of the invention embodied in an automatic volume control amplifying system. The apparatus comprises a seismic detector 10, an automatic volume control amplifier 11 (shown in simplified form) and a recorder 12, all of which are or can be of conventional construction; and auxiliary control means including a control amplifier 13, a control rectifier 14, a rectifier 65 and two filters 15 and 16. The detector is shown diagrammatically as including a case 17 adapted to be set in the ground (not shown) and containing a fixed coil 18 and a permanent magnet 19 suspended on springs 20 adjacent the coil. Upon trembling of the earth at the detector, an oscillating electrical signal is produced in a pair of leads 21 from the coil, which corresponds to the earth vibration. The amplifier 11 is shown as including a tube 24, and a remote cut-off control tube 25 so arranged in the circuit that the gain or amplification factor of the amplifier is diminished according to the instantaneous value of a control voltage applied to the grid 26 of tube 25 in such direction as to bias the grid. The gain of the amplifier is diminished or increased according as the voltage applied to grid 26 is varied or lowered. The biasing voltage is applied, by means to be described, through a lead 29. Detector leads 21 are applied to the input end of the amplifier as shown and the amplified electrical signal is taken off through a pair of leads 30 and 31 and is applied to the recorder, which includes an oscillograph element 32 and a motor-driven sheet of photographic sensitized paper 33. In the recorder, the amplified signal is recorded as a wavy trace 34 on the paper. It is this recorded trace which is studied by the operators and from which information is secured as to subsurface geological structure.

The control amplifier 13 includes a vacuum tube 35 having a cathode 36, grid 37 and plate 38. A part of the amplified signal energy from amplifier 11 is applied to the input or grid side of tube 35 by means of an auxiliary transformer winding 27 on the output transformer 28 of amplifier 11, a lead 39 and a lead 40 as shown. This auxiliary winding is provided because the voltages required for the control circuits are somewhat higher than the voltage required for operation of oscillograph 32. Lead 30 is grounded at 41, and the cathode 36 of tube 35 is grounded at 42 through a lead 43, to complete the input circuit for amplifier 13. The amplified signal from tube 35 is applied through an output transformer 44 to a diode rectifying tube 45 containing a cathode 46 and a plate 47, whereby the signal is converted into a (pulsating) direct current, which is smoothed by means of a filter consisting of a resistor 48 and a condenser 49 connected across a lead 50 from transformer 44 and a lead 51 from cathode 46, all as shown.

Part of the output from rectifier 14 is applied to grid 26 of the bias-controlled tube 25 of amplifier 11, through a lead 52 joining lead 50 at 60, and filter 16 which consists of a resistor 53 and a resistor 54 and condenser 55, in series-parallel connection across leads 52 and 51 as shown. A lead 56 from a variable tap 57 on resistor 54 goes to a bias battery 58 and thence to the grid of the bias-controlled tube, as shown. Upon appearance of an amplified signal at the output of the main amplifier 11, a D. C. bias voltage appears in lead 29 which adds to the bias voltage of battery 58 thereby tending to reduce the gain of amplifier 11, in accordance with the amplitude of the seismic signals being received. Referring to filter 16, the voltage from the rectifier 14 tends to charge condenser 55, and time required for the condenser to discharge depends on the shunting effect of resistor 54. Variable tap 57 may be used to adjust the amount of control.

Another part of the D. C. current from rectifier 14 is applied through rectifier 65 to filter 15, which consists of two resistors 66 and 67 and a condenser 68 arranged as shown, in series-parallel connection across leads 50 and 51. Current from the filter is supplied through a lead 69, a bias battery 70 and a resistor 71, to the grid 37 of the control amplifier tube 35, in such direction as to bias the grid and thereby to lower the amplification factor or gain of the tube. Filter 15 resembles filter 16, but is arranged to have a much greater time constant of discharge; several times greater than that of filter 16. Rectifier 65 is so arranged that the condenser 68 can be charged through it but cannot be discharged through it.

Elements 39, 13, 14, 52, 16 and 29 thus form a control channel between the output of amplifier 11 and the controller tube 25 therein.

Polarities existing in the circuits are indicated by plus and minus signs at elements 48, 54 and 67.

In operation, on receipt of the first arrival at the detector (10), an amplified signal appears at the output of amplifier 11 and is recorded. Almost immediately, a biasing voltage appears in lead 29, biasing tube 25 and thereby sharply diminishing the gain of the amplifier 11. However, a biasing voltage is at the same time being developed in lead 69 and soon this biases the control amplifier tube 35 beyond cut-off, thereby rendering this control amplifier ineffective. The tube 35 thus acts as a blocking device in the control channel. Therefore bias voltage is no longer supplied to lead 29, and the gain of amplifier 11 rises to its normal value. The tube 35 ceases to function for quite a few seconds once a strong signal has been received.

Fig. 2 shows the relationship between the received signals and the time constants of the two control voltages. Instantaneous control voltages occurring in leads 29 and 69 are plotted respectively at 129 and 169. The explosive charge is fired at instant zero, and a short time later a high amplitude wave train 75 is picked up at the detectors (the first arrival). When this first arrival is received, the control voltages begin to build up rapidly, as shown by the steepness of the curves, and at some point 76 the control amplifier 13 becomes completely suppressed or "squelched" by reason of its tube being biased beyond cut-off. The amplifier thereafter produces no more control voltage in either lead 29 or lead 69, and voltages 129 and 169 soon cease to increase. Voltage 129 is then made to die away at some convenient rate to vary the amplifier gain during the reception of the later arrivals 77, 78, 79, etc. Voltage 169 is made to die away much more slowly, as is indicated by the gentler slope of the curve in Fig. 2, so that the control amplifier 13 is prevented from acting again and thereby cause irregularities in the decaying control voltage 129. Rectifier 65, selective to direction of current, is necessary to allow voltage 169 to die away more gradually than voltage 129, as in the absence of the rectifier the voltage in filter 15 would discharge into filter 16.

Curve 129 of Fig. 2 may be considered as roughly inversely proportional at any given instant, to the gain of amplifier 11, which is indicated by a dotted line as shown. The gain of the amplifier is high just at the instant of reception of the first arrival, then falls abruptly, and gradually rises to its normal or uncontrolled value.

If desired, the auxiliary control voltage for suppressing the control amplifier can be taken off directly from the control amplifier output and applied through rectifier 65 to filter 15, instead of being taken off at rectifier 14 as shown in Fig. 1. Fig. 3 shows such a modification. Rectifier 65 is connected to plate 38 of tube 35 via a condenser 99 and a lead 100, so that filter 15 is fed directly from the control amplifier, instead of from the control rectifier 14 as in Fig. 1. A resistor 101 is arranged as shown to complete the circuit for the D. C. component produced by rectifier 65. Otherwise the apparatus of Fig. 3 is like that of Fig. 1, and operates the same way.

In Figs. 1 and 3, elements 39, 13, 14, 16 and 29 make up, with grid 26 of the amplifier tube 25, the primary control circuit. The secondary control circuit of Fig. 1 includes elements 50, 65, 15, 69, 70 and 71. The secondary control circuit of Fig. 3 includes elements 99, 100, 65, 15, 69, 70 and 71.

As stated, in some cases it is desired to control the frequency response of a seismograph amplifier rather than, or in addition to, controlling the gain thereof, and Fig. 4 illustrates the application of the invention to such utilization. In Fig. 4 the seismic detector 10 delivers signals to a main amplifier 111, shown as of the heterodyne type comprising a low-frequency amplifier 112, a modulator 113, a high-frequency amplifier 114, a detector stage 115, and a final low-frequency amplifier 116, delivering to the recorder 12. This heterodyne amplifier is of a type known per se and needs no detailed description. A modulating current is supplied to the modulator through a lead 117 by a vacuum tube oscillator 118, which is not in itself a part of the present invention and which is of a type characterized by having its output frequency dependent upon the magnitude of a bias voltage applied to a grid 119 of the oscillator vacuum tube 120. As the oscillator output frequency is varied (by means hereinafter described) the tuning frequency of the main amplifier 111 is correspondingly varied.

The oscillator output frequency is varied under control of signal current developed in the main amplifier 111. Thus, stages 114 and 115 of the main amplifier are coupled by a transformer 122, having an auxiliary winding 123 which is connected to the input side of control amplifier 13 which is the same as the control amplifier of Fig. 1. The amplified control current is rectified in control rectifier 214 which is like the rectifier 14 of Fig. 2 except that it is of the whole-wave type, as shown, utilizing a double-plate rectifying tube 145. The rectified control voltage is applied through a lead 124 to filter 16 which is like that of Fig. 1 and plays a similar part. The filtered control voltage is applied to the oscillator tube grid 119 through a resistor 125. Thus upon increase in signal amplitude, as picked up at coil 123, the main amplifier 111 is tuned to higher frequencies, and vice versa.

The voltage for suppressing the control amplifier is obtained as follows: The last stage (116) of amplifier 111 is coupled to the recorder 12 through a transformer 126 having an auxiliary winding 127 center-tapped at 128. The current in winding 127 is rectified by a rectifier 165 which takes the form of a full-wave rectifier utilizing a double-plate tube 130, and the rectified current is filtered by filter 15 and applied to the grid 37 of control amplifier tube 35 as shown. Shortly after receipt of the first wave, the control amplifier action is suppressed, so that the control voltage ceases to increase and thereafter decreases gradually. This causes the tuning frequency of the main amplifier to stop its initial frequency rise and then drop slowly to its normal low frequency value. As in the circuit of Fig. 1, filter 15 has a long discharge time constant so as to prevent further response of the control circuit for many seconds after the first strong arrival.

In Fig. 4 the primary control circuit includes elements 123, 13, 214, 124, 16, 125 and 119. The secondary control circuit includes elements 127, 165, 15 and 123.

While the invention has been described principally in reference to seismograph prospecting systems, it is as stated also useful in sonic depth finders, submarine signalling apparatus and other apparatus for receiving and registering vibrations wherein the same recording or registering problems arise as in seismograph prospecting.

What I claim is:

1. In apparatus for receiving a series of mechanical vibrations that begins with a relatively high amplitude portion, followed by a portion of generally less amplitude, which apparatus includes detector means adapted to detect such vibrations and to produce oscillating electrical signals of fluctuating amplitude in response to such vibrations, a signal amplifier coupled to the detector means, a signal recorder coupled to the amplifier, a primary amplifier-characteristic control circuit associated with the amplifier circuit and which is adapted on supply to said control circuit of signal energy to vary a characteristic of the amplifier in proportion to said signal energy, and on suppression of said supply to gradually produce progressively less variation in said characteristic, and means for supplying signal energy to said circuit; the improvement comprising a secondary control circuit associated with said primary control circuit and adapted on supply of signal energy to said secondary control circuit, above a predetermined amplitude, gradually to suppress and maintain suppressed said supply of signal energy to the primary control circuit, and means supplying signal energy to said secondary control circuit; whereby beginning after receipt of signal energy above said predetermined amplitude said amplifier characteristic is gradually restored to its uncontrolled value.

2. In methods of seismograph prospecting wherein a series of seismic vibrations of amplitude initially high and decreasing with time are detected, converted into electrical signals and the signals are amplified electrically and recorded, and the amplification gain is controlled by a controller supplied with signal energy and of such character that on supply thereto of such energy the controller acts to lower the gain and when supply of signal energy thereto is arrested it gradually and progressively restores the gain: the improvement which comprises cutting off the supply of signal energy to the gain controller immediately after receipt of the initial high amplitude signals and keeping such supply cut off throughout receipt of the remainder of the series of vibrations, whereby the gain increases smoothly without falling off to lower values, subsequent to receipt of the initial high amplitude signals, uninfluenced by subsequent fluctuations in amplitude of signal energy.

3. In apparatus for receiving a series of mechanical vibrations, the combination of a main signal energy channel including detector means adapted to detect such vibrations and produce oscillating electrical signals of fluctuating amplitude in response thereto, a signal amplifier connected to the detector and including a signal amplifier control means adapted to vary a characteristic of the amplifier in accordance with the magnitude of a potential applied to the control means, a signal recorder connected to the amplifier; a primary control circuit including means for diverting from said channel a portion of the signal energy into a channel separate from the main signal energy channel, amplifying means, rectifying means and filter means in the diverted signal energy channel and means for applying amplified, rectified, filtered signal energy from said primary control circuit to the signal amplifier control means in such manner as to progressively vary the amplifier characteristic a short lag interval after a variation in signal energy; a secondary control circuit including a second filter means in said diverted signal energy channel, and means for applying, and maintaining applied, a portion of rectified, filtered signal energy to said diverted signal energy amplifying means in such manner as to render said amplifying means insensitive a short time after appearance of the initial strong signal energy at said control circuits.

4. In apparatus for seismograph prospecting comprising a main signal channel which includes a signal amplifier, control means for controlling a characteristic of the amplifier in accordance with the magnitude of a potential applied to the control means, and a control channel which includes means for diverting a portion of signal energy from said main channel and means for rectifying said diverted signal energy and applying it to said control means for operation thereof, said control means and control channel being so constituted that upon appearance of signal energy therein said control means acts promptly to control said characteristic and on suppression of signal energy therein the control means acts to gradually restore said characteristic to its uncontrolled value: the improvement comprising a blocking device in said control channel, adapted normally to pass current in said channel but upon being energized to block flow of current in said channel, means adapted to be put in operation by diverted signal energy and upon occurrence of such energy to energize the blocking device promptly, and means operative to keep the blocking device in de-energized condition for a period long with respect to the time during which the control means restores said characteristic to uncontrolled value.

5. The apparatus of claim 1 wherein the primary amplifier-characteristic control circuit is a gain-control circuit.

6. A method of amplifying a series of seismic wave signals which are of initially high amplitude and subsequently decaying amplitude but with a plurality of transient high amplitude wave groups, with the aid of an amplifier circuit which includes a device adapted to vary an amplification characteristic proportionally to the amplitude of electrical energy applied to the device, which method comprises the operations of supplying signal energy to said device during the initial high amplitude part of the series, whereby during such part of the series the amplification characteristic is varied proportionally to signal amplitude, and then suppressing such supply, and causing energy already supplied to said device to bleed off gradually throughout a period of time lasting at least until the end of the series of wave signals, whereby during the later part of the series said characteristic is varied at a rate determined by the rate of said bleed-off of energy.

7. A method of amplifying at variable gain a series of seismic waves initially of high amplitude and of generally decaying amplitude but with a plurality of transient high amplitude wave groups, which comprises regulating the amplification gain during the initial high amplitude part of the series in an inverse proportion to signal amplitude, and throughout the part of the series subsequent to said initially high amplitude part gradually increasing the gain independently of fluctuations of signal amplitude as a function of time.

OTTO F. RITZMANN.